United States Patent
Guillotte et al.

(10) Patent No.: US 9,377,065 B2
(45) Date of Patent: Jun. 28, 2016

(54) TRANSMISSION HYDRAULIC RETARDER CONTROL SYSTEM AND METHOD OF OPERATING

(71) Applicant: Caterpillar Inc., Peoria, IL (US)

(72) Inventors: Andrew R. Guillotte, East Peoria, IL (US); Travis Miller, Washington, IL (US); Don Wilbur, Manito, IL (US); Mark Batdorff, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 44 days.

(21) Appl. No.: 14/331,976

(22) Filed: Jul. 15, 2014

(65) Prior Publication Data
US 2016/0016570 A1    Jan. 21, 2016

(51) Int. Cl.
*F16D 57/04* (2006.01)
*B60T 1/087* (2006.01)
*B60T 10/02* (2006.01)

(52) U.S. Cl.
CPC ............... *F16D 57/04* (2013.01); *B60T 1/087* (2013.01); *B60T 10/02* (2013.01)

(58) Field of Classification Search
USPC ................................ 192/3.34, 216
See application file for complete search history.

(56) References Cited

U.S. PATENT DOCUMENTS

| | | | | |
|---|---|---|---|---|
| 2,946,416 A | * | 7/1960 | Snoy | F16D 33/16 180/53.1 |
| 3,659,687 A | * | 5/1972 | Edmunds | F16H 41/30 192/216 |
| 3,814,221 A | * | 6/1974 | Fuehrer | F16D 65/78 192/221 |
| 3,863,739 A | * | 2/1975 | Schaefer | B60T 1/087 188/181 C |
| 4,881,625 A | | 11/1989 | Redelman | |
| 5,090,523 A | | 2/1992 | Vogelsang | |
| 5,101,941 A | | 4/1992 | Long et al. | |
| 5,456,340 A | | 10/1995 | Dadel et al. | |
| 5,507,360 A | | 4/1996 | Simmons | |
| 6,817,455 B1 | | 11/2004 | Gazyakan et al. | |
| 7,527,338 B2 | | 5/2009 | Long et al. | |

FOREIGN PATENT DOCUMENTS

| | | | | |
|---|---|---|---|---|
| EP | 1224408 A1 | 7/2002 | | |
| EP | 1308359 A2 | 5/2003 | | |
| GB | 1264238 A | * 2/1972 | ............. | F16D 57/04 |

* cited by examiner

*Primary Examiner* — Richard Lorence
(74) *Attorney, Agent, or Firm* — Leydig, Voit & Mayer, Ltd.

(57) ABSTRACT

A method of operating a hydraulic retarder includes directing fluid from a retarder pump to the retarder when the retarder is turned on, directing fluid from a main pump by way of a torque converter to the retarder when the retarder is on, but not filled. When the retarder is off or is on and filled, the method includes directing fluid from the main pump by way of the torque converter to at least one of a lube operation, the tank or a cooler.

16 Claims, 11 Drawing Sheets

TRANSMISSION HYDRAULIC RETARDER CONTROL SYSTEM AND METHOD OF OPERATING

TECHNICAL FIELD

This patent disclosure relates generally to transmission hydraulic retarders, and, more particularly to a control system for a transmission hydraulic retarder.

BACKGROUND

Automatic transmissions in relatively large mobile machines often include a hydrodynamic retarder or hydraulic retarder that is associated with the output of, or input to, the transmission. When employed, hydraulic retarders utilize relative rotation of components within the retarder to assist in slowing the machine. The hydrodynamic retarder converts energy from the driveline into heat, which is then typically dissipated using the transmission oil cooling system.

Heat generated within the hydraulic retarder is dependent upon pressure developed with the hydraulic retarder. Flow into and out of the hydraulic retarder is sometimes controlled by respective valves. U.S. Pat. No. 7,527,338 B2 to Long, et al., discloses a hydromatic retarder control apparatus. The apparatus uses a retarder multi-function valve and a retarder regulator valve to provide flow to a flow valve and on to the retarder, lube cooler from a fluid pump, and return flow from the retarder.

SUMMARY

The disclosure describes, in one aspect, a method of operating a hydraulic retarder in a mobile machine that includes a transmission having a torque converter. The method includes, when the hydraulic retarder is turned off, providing fluid from a main pump to the torque converter, providing fluid from the torque converter to at least one of lube and a tank, and at least one of recirculating fluid from a retarder pump back to the retarder pump, and providing fluid from the retarder pump to the tank. The method further includes, when the hydraulic retarder is turned on, providing fluid from the retarder pump to the hydraulic retarder, providing fluid from the torque converter to the hydraulic retarder until such time as the hydraulic retarder is full, and providing fluid from the torque converter to at least one of lube and the tank when the torque converter is filled.

The disclosure describes, in another aspect, a transmission hydraulic retarder control system for controlling fluid to a hydraulic retarder associated with a transmission. The hydraulic retarder is adapted to selectively provide retarding functions when on and not provide retarding functions when off. The transmission includes a torque converter. The control system includes at least one tank, at least one lube operation, a cooler, a retarder pump, and a main pump fluidly coupled to provide fluid to the torque converter. The control system further includes at least one valve fluidly coupled to selectively direct fluid from the retarder pump to the hydraulic retarder when the hydraulic retarder is providing retarding functions, and to at least one of the tank and recirculation to the retarder pump when the hydraulic retarder is not providing retarding functions. The control system also includes at least one valve fluidly coupled to selectively direct fluid from the torque converter to the cooler when the hydraulic retarder is off, direct fluid from the torque converter to the hydraulic retarder when the hydraulic retarder is on but not filled, and to direct fluid from the torque converter to at least one of the tank or lube when the hydraulic retarder is on and filled.

The disclosure describes, in yet another aspect, a transmission hydraulic retarder control system for controlling fluid to a hydraulic retarder associated with a transmission. The hydraulic retarder is adapted to selectively provide retarding functions when on and not provide retarding functions when off. The transmission includes a torque converter. The control system includes at least one tank, at least one lube operation, a cooler, a retarder pump, a main pump fluidly coupled to provide fluid to the torque converter, a retarder-flow valve, and a fill-switch valve. The retarder-flow valve is fluidly coupled to the torque converter, the hydraulic retarder, the cooler, the at least one lube operation, the retarder pump, and the fill-switch valve. The retarder-flow valve is adapted and fluidly coupled to selectively direct fluid from the torque converter to the cooler when the hydraulic retarder is off, and to direct fluid from the torque converter to the fill-switch valve when the hydraulic retarder is on. The retarder-flow valve is also adapted and fluidly coupled to selectively direct fluid from the retarder pump to the hydraulic retarder when the hydraulic retarder is on, and to direct fluid from the retarder pump to at least one of back to the retarder pump or to the tank when the hydraulic retarder is off. The fill-switch valve adapted and fluidly coupled to direct fluid from the retarder-flow valve to the hydraulic retarder when the hydraulic retarder is on but not filled, and to direct fluid from the retarder-flow valve to at least one of the tank and the at least one lube operation when the hydraulic retarder is on and filled.

BRIEF DESCRIPTION OF THE DRAWING(S)

FIG. 2 is the schematic representation of FIG. 1 with the retarder on;

FIG. 7 is the schematic representation of FIG. 6 with the retarder on;

DETAILED DESCRIPTION

Figure 1:
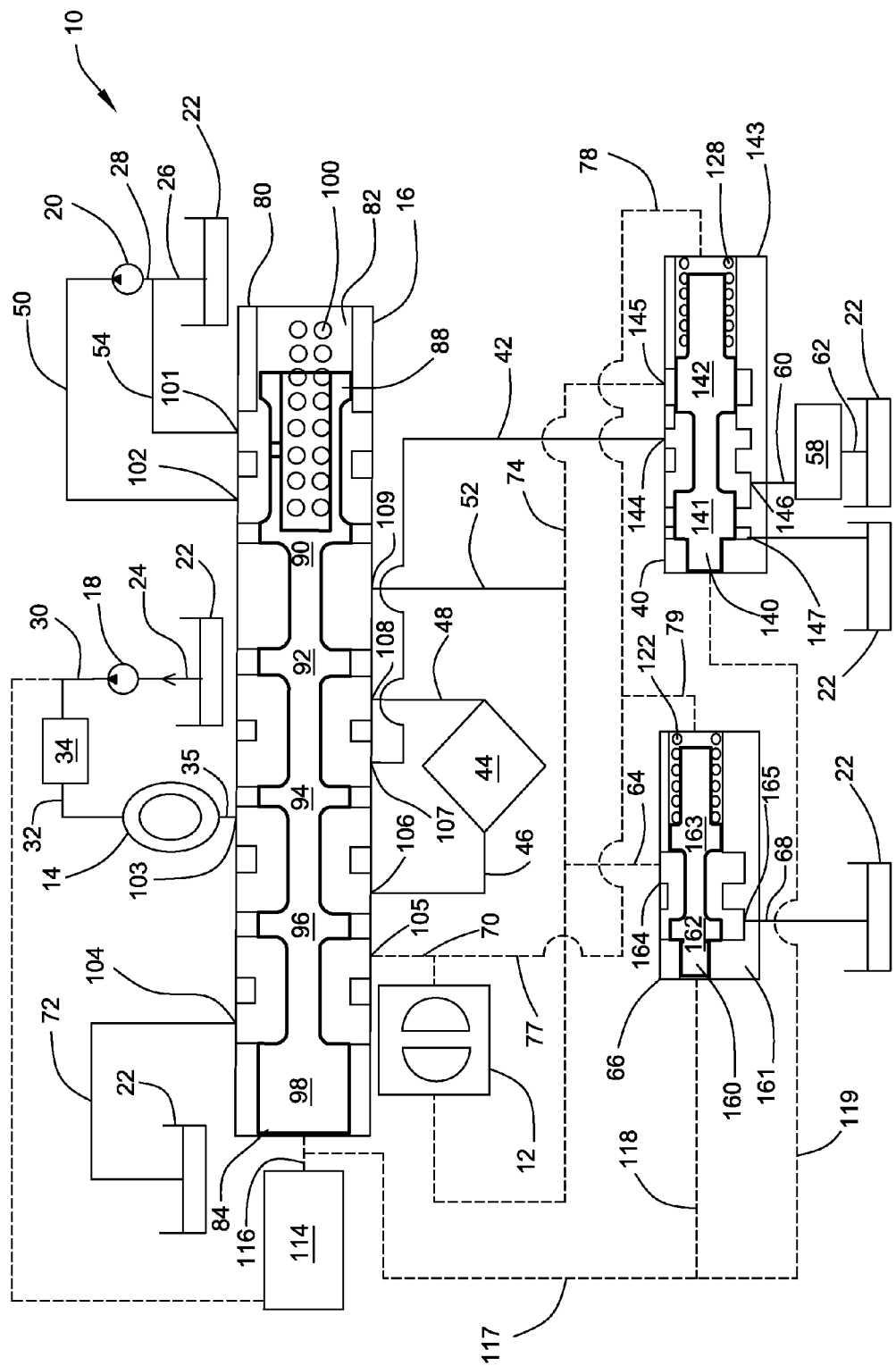
FIG. 1 is a schematic representation partly in block diagram form showing a hydraulic retarder control system according to aspects of this disclosure, the retarder being off.
Figure 2:
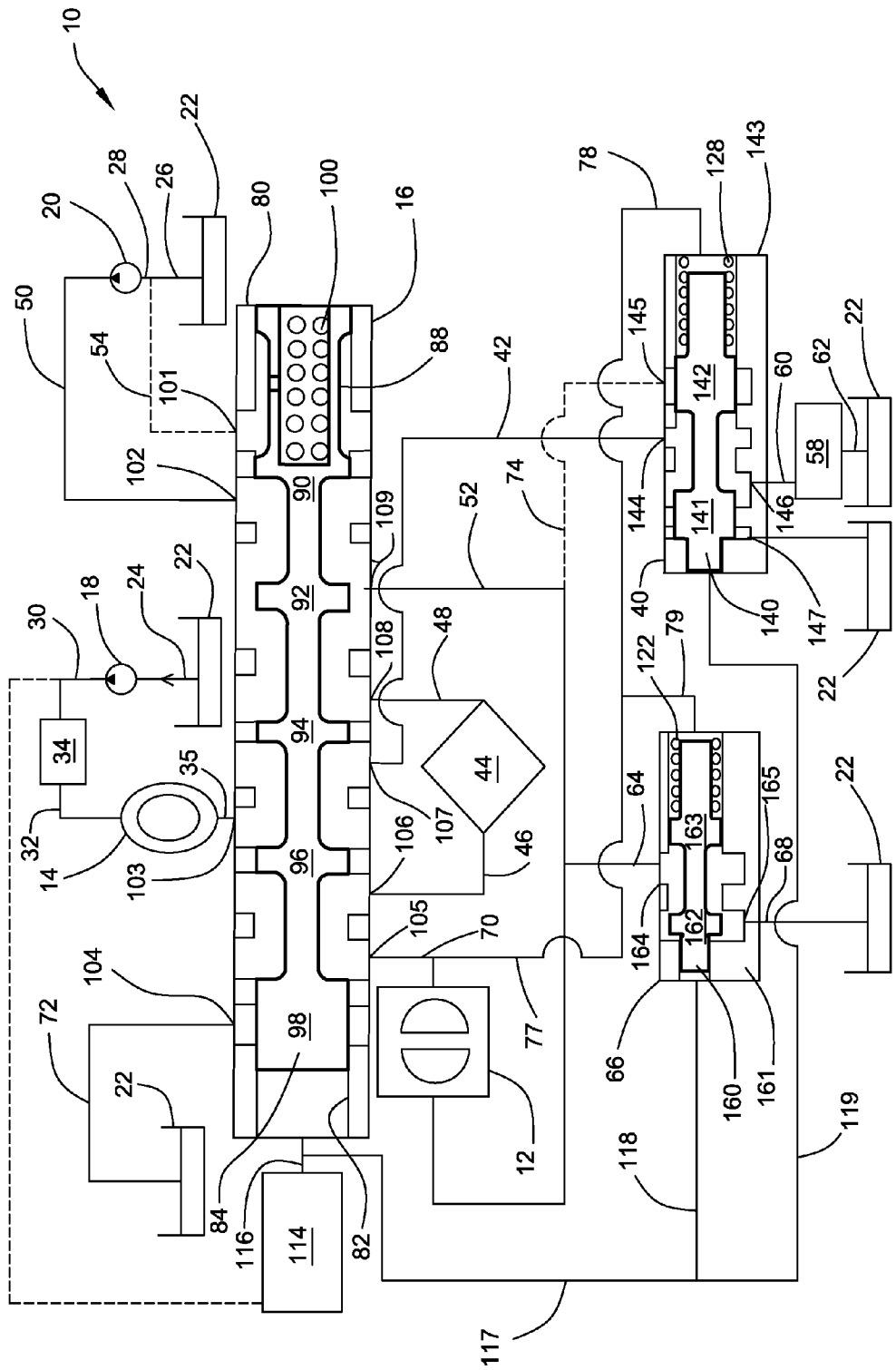
Figure 3:
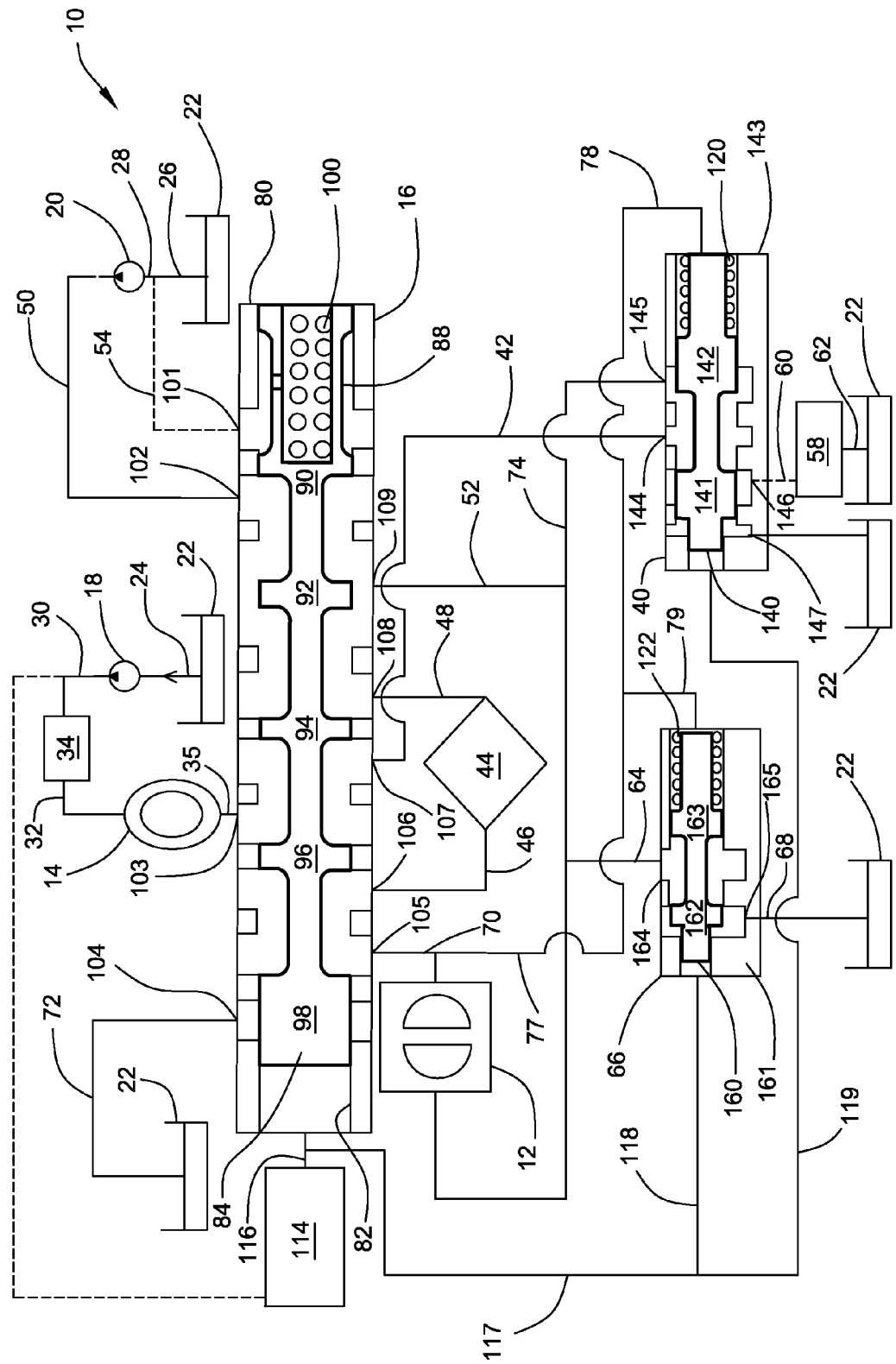
FIG. 3 is the schematic representation of FIG. 1 in a rapid fill configuration.

Referring to FIG. 1, the hydraulic retarder control system 10 provides control of hydraulic fluid flow to a hydraulic retarder 12 as well as a torque converter 14 in connection with a transmission (not further illustrated). The hydraulic retarder control system 10 further includes a retarder flow valve 16. It will be appreciated, that the retarder flow valve 16 may alternately be a plurality of valves (not illustrated) directed to the various flows through the retarder flow valve 16. The illustrated retarder flow valve 16 includes a valve body 80 having a valve bore 82 in which a valve spool 84 is slidably disposed. The valve spool 84 has a plurality of equal diameter lands 88, 90, 92, 94, 96, 98 disposed along its length. The valve spool 84 is urged to the left as illustrated in FIGS. 1-3 by a spring 100. The valve body 80 includes a plurality of inlet and exhaust ports 101-109 that are fluidly connected to the various conduits described throughout this disclosure. Movement of the valve spool 84 causes the lands 88, 90, 92, 94, 96, 98 to block or connect the ports to direct flow through the retarder flow valve 16.

In order to provide retarding power, a retarder pump 20 is provided. The retarder pump 20 may selectively supply fluid from tank 22 to the retarder flow valve 16 by way of conduits 26, 28 and retarder-pump-out conduit 50. While the reference number 22 is utilized throughout as a designation for the tank, it will be appreciated that one or more tanks may be provided. Depending upon the position of the valve spool 84 of the retarder flow valve 16, fluid from retarder-pump-out conduit 50 may be selectively directed toward the hydraulic retarder 12 by way of first-retarder-in conduit 52 (see "retarder on" position of FIGS. 2-3), or returned to the tank 22 or the retarder-pump-supply conduit 28 by way of retarder-pump-return conduit 54 (see "retarder off" position of FIG. 1).

More specifically, when the hydraulic retarder 12 is off, the valve spool 84 is in the "retarder off" position illustrated in FIG. 1. In this "retarder off" position, lands 88, 90 are positioned to connect ports 101, 102 such that fluid from the retarder pump 20 provided through the retarder-pump-out conduit 50 and port 102 is directed through port 101 to retarder-pump-return conduit 54. Moreover, with the lands 96 and 98 positioned as illustrated in FIG. 1, a retarder-out conduit 70 may be fluidly coupled to the tank 22 by way of ports 105 and 104 and drain conduit 72. Thus, should any outflow or drainage be provided from the hydraulic retarder 12, it may be directed to the tank 22.

Conversely, if when the hydraulic retarder 12 is on, the valve spool 84 is in the "retarder on" position illustrated in FIGS. 2 and 3. In this "retarder on" position, lands 90, 92, 94 are positioned with land 90 blocking flow from port 102 to port 101 such that fluid from the retarder pump 20 provided through the retarder-pump-out conduit 50 and port 102 is directed through port 109 to a first-retarder-in conduit 52 and on to the hydraulic retarder 12.

With lands 96, 98 positioned as illustrated in FIGS. 2 and 3, flow between ports 105 and 104 is blocked, while flow between ports 105 and 106 is opened. As a result, flow within the retarder-out conduit 70 flows into port 105 of retarder flow valve 16 and out of port 106 to a cooler 44 through cooler-in conduit 46. Cooled fluid from the cooler 44 then flows through cooler-out conduit 48. In the illustrated embodiment, the cooled fluid may be mixed with the fluid pumped from the tank 22 by the retarder pump 20. In this regard, cooled fluid likewise flows from cooler-out conduit 48 into port 108 to a chamber bounded by lands 90, 94 where it is mixed with fluid entering the chamber from the retarder pump 20 through port 102. The fluid then flows out through port 109 to the first-retarder-in conduit 52.

Fluid flow within the transmission hydraulic retarder control system 10 may further be controlled by one or more additional valves. In the embodiment illustrated in FIGS. 1-3, the transmission hydraulic retarder control system 10 additionally includes a fill-switch valve 40 and a retarder-pressure-relief valve 66 that direct flow to or from the retarder flow valve 16 and other components.

The fill-switch valve 40 may be of any appropriate design. As with the retarder flow valve 16, in the illustrated embodiment, the fill-switch valve 40 is a spool valve. The fill-switch valve 40 includes a fill-switch valve spool 140, having lands 141, 142. The fill-switch valve spool 140 is slidably disposed in a valve body 143 that includes ports 144, 145, 146, 147.

When the hydraulic retarder 12 is off, as illustrated in FIG. 1, and when the retarder is on during normal operation, as illustrated in FIG. 2, the fill-switch valve spool 140 is in a "retarder on/off" position. As a result, fluid received from the retarder flow valve 16 by way of the fill-switch-valve-in conduit 42 is received through port 144, and directed to a secondary operation. Here, the secondary operation is lube 58. Accordingly, the retarder flow valve 16 directs fluid to lube-in conduit 60 by way of port 146. Lube-in conduit 60 is fluidly connected to at least one lube operation, referenced in this disclosure as lube 58. Fluid from lube 58 may further be directed to lube-out conduit 62 and on to the tank 22.

The retarder-pressure-relief valve 66 may similarly be of any appropriate design. As with the retarder flow valve 16 and the fill-switch valve 40, in the illustrated embodiment, the retarder-pressure-relief valve 66 is a spool valve. The retarder-pressure-relief valve 66 includes a slidable spool 160 within a valve body 161. The spool 160 includes a plurality of lands 162, 163 that may be selectively disposed to inhibit flow or allow selective flow through the retarder-pressure-relief valve 66 through ports 164, 165.

A pressure-relief line 64 fluidly couples the first-retarder-in conduit 52 to the retarder-pressure-relief valve 66. In this way, the retarder-pressure-relief valve 66 may be utilized to bleed fluid off to the tank 22 or another location in order to reduce the pressure within the first-retarder-in conduit 52, and, therefore, within the hydraulic retarder 12. It will be appreciated by those of skill in the art that the degree to which the retarder-pressure-relief valve 66 is opened will determine the level of pressure relief provided.

According to another feature of the hydraulic retarder control system 10, a plurality of pumps 18, 20 is utilized in the initial filling of the hydraulic retarder 12 in order to provide a fast fill of the hydraulic retarder 12. While the plurality of pumps 18, 20 is illustrated with separate pumps, the pumps 18, 20 could alternately be housed in a single housing (not illustrated), providing economies in packaging and assembly. The operation of the first of these pumps was explained above with regard to the retarder pump 20. The second of these pumps is identified here as a main pump 18. The main pump 18 may be utilized for one or more primary functions when the hydraulic retarder 12 is off or is on, as illustrated in FIGS. 1 and 2, respectively. In this embodiment, the main pump 18 may be utilized to supply fluid to a torque converter 14 in connection with the transmission, and to lube 58. During initial fill operations, however, the main pump 18 may be utilized to supplement flow to the hydraulic retarder 12 to provide a more rapid fill, which may facilitate effective operation of the hydraulic retarder 12 more quickly.

In the illustrated embodiment, a main pump 18 supplies fluid from the tank 22 to the torque converter 14 by way of a conduit 24, main-pump-out conduit 30, and torque-converter-in conduit 32. Those of skill in the art will appreciate that the transmission includes a plurality of transmission control valves 34 between the main pump 18 and the torque converter 14.

When the retarder flow valve 16 is in the "retarder off" position with lands 94, 96 disposed as illustrated in FIG. 1, fluid flowing from the torque converter 14 through a torque-converter-out conduit 35 flows into the retarder flow valve 16 through port 103, and out of the retarder flow valve 16 through port 106 toward the cooler 44. That is, fluid exiting the torque converter 14 flows through the retarder flow valve 16 to the cooler-in conduit 46 to be cooled by the cooler 44. Cooled fluid from the cooler 44 flows through cooler-out conduit 48 and returns to the retarder flow valve 16 through port 108. With lands 92, 94 disposed as illustrated in FIG. 1, the cooled fluid is then directed by the retarder flow valve 16 through port 107. The cooled fluid may be further directed by the retarder flow valve 16 for an additional function. Here, fluid from port 107 flows through fill-switch-valve-in conduit 42. With lands 141, 142 of the valve spool 140 of the fill-switch valve 40 positioned as illustrated in FIG. 1, fluid entering the fill-switch valve 40 through port 144 further flows through port 146 to lube-in conduit 60 to lube 58.

Conversely, when the hydraulic retarder 12 is on, the retarder flow valve 16 is translated to the position illustrated in FIG. 2. As a result, with lands 94, 96 in the positions of FIG. 2, fluid from the torque converter 14 flowing through torque-converter-out conduit 35 and into the retarder flow valve 16 through port 103 is directed by the retarder flow valve 16 directly through port 107. From port 107, fluid from the main pump 18 provided to the torque converter 14 flows through fill-switch-valve-in conduit 42, the fill-switch valve 40, and on to lube 58, as discussed above. Thus, when the hydraulic retarder 12 is off (FIG. 1), flow from the torque converter 14 is first cooled by the cooler 44 before being directed to the fill-switch valve 40 and on to lube 58. When the hydraulic retarder 12 is on during normal operation (FIG. 2), however, the retarder flow valve 16 directs flow from the torque converter 14 directly to the fill-switch valve 40, which directs the fluid to lube 58.

When functioning of the hydraulic retarder 12 is first initiated, in order to quickly fill the hydraulic retarder 12, the main pump 18 is utilized to assist the retarder pump 20 in filling operations. FIG. 3 illustrates the transmission hydraulic retarder control system 10 is in a "fast fill" condition. When the hydraulic retarder 12 is off, the valve spool 84 of the retarder flow valve 16 is disposed in the "retarder off" position illustrated in FIG. 1. Regardless of whether the hydraulic retarder 12 is on and operating normally (FIG. 2) or in the "fast fill" condition (FIG. 3), the valve spool 84 is disposed in the "retarder on" position. In contrast, the fill-switch valve spool 140 is disposed in the same "on/off position" regardless of whether the hydraulic retarder 12 is off (FIG. 1) or is operating under normal conditions (FIG. 2).

When operation of the hydraulic retarder 12 is initiated, however, and it is desirable to quickly fill the hydraulic retarder 12 so that normal on conditions may be obtained, the fill-switch valve spool 140 moves to the second position, that is, the "fast fill" position illustrated in FIG. 3. As a result, land 141 of the fill-switch valve spool 140 is positioned to block flow through the fill-switch valve 40 to port 146, and, therefore, block flow to lube 58. With lands 141, 142 positioned as illustrated in FIG. 3, port 145 is opened to provide flow through the fill-switch valve 40 to a second-retarder-in conduit 74. That is, flow from the torque converter 14 is directed through the second-retarder-in conduit 74 to join with the flow within the first-retarder-in conduit 52 to provide fluid to the hydraulic retarder 12. As explained above, when the retarder flow valve 16 is in the "retarder on" position of FIGS. 2 and 3, flow to the first-retarder-in conduit 52 is derived from flow from the retarder pump 20 as well as cooled flow from the hydraulic retarder 12 itself. In this way, the flows from both the retarder pump 20 and the main pump 18 may be utilized to quickly fill and bring the hydraulic retarder 12 up to a required operating pressure. Once the hydraulic retarder 12 is filled, or a desired pressure is reached within the hydraulic retarder 12, the fill-switch valve spool 140 is moved from the "fast fill" position illustrated in FIG. 3, back to the retarder on/off position illustrated in FIGS. 1 and 2.

Retarder flow valve 16, the retarder-pressure-relief valve 66 and the fill-switch valve 40 may be operated by any appropriate arrangement. The illustrated valve spool 84, for example, is biased toward the "retarder off" position illustrated in FIG. 1 by biasing element or spring 100 disposed at one end. In order to move the valve spool 84 of the retarder flow valve 16 to a "retarder on" position, as illustrated in FIGS. 2 and 3, a selectively actuable solenoid valve 114 is provided. Hydraulic fluid may be provided to the solenoid valve 114 by any appropriate source. For example, hydraulic fluid may be provided from the main-pump-out conduit 30 or by way of one or more of the transmission control valves 34.

Upon application of braking requiring hydraulic retarding, pressure is selectively applied through the solenoid valve 114 and actuation conduit 116 to the land 98 of the valve spool 84, resulting in a rightward shift in the valve spool 84 against the force of spring 100. Pressure selectively applied through the solenoid valve may be provided from any appropriate source. For example, fluid pressure from the main pump 18 or another source may be directed through the solenoid valve 114. Operation of the solenoid valve 114 may be based upon instruction received from an operator or electronic control (not illustrated). Those of skill in the art will appreciate that hydraulic pressure applied through the solenoid valve 114 will be proportional to the electric current supplied for operation of the solenoid valve 114. In this way, the retarder flow valve 16 may be actuated to move the valve spool 84 to the "retarder on" position illustrated in FIGS. 2 and 3. When hydraulic pressure applied to the land 98 is discontinued, the spring 100 will return the valve spool 84 to its "off position" illustrated in FIG. 1.

The retarder-pressure-relief valve spool 160 may likewise be biased toward the open position illustrated in FIG. 1 by an appropriate biasing element or spring 122, allowing fluid from the first-retarder-in conduit 52 to drain freely through the retarder-pressure-relief valve 66 to the tank 22. Similarly, the fill-switch valve spool 140 may be biased toward the position illustrated in FIGS. 1 and 2 by a biasing element or spring 128, to provide flow through the fill-switch valve 40 to lube 58. Additional control of each of these valves 66, 40 may be obtained by forces exerted as a result of operator or electronic control, and/or by pressures developed within the transmission hydraulic retarder control system 10.

In order to controllably or selectively bleed fluid from the first-retarder-in conduit 52, control of the retarder-pressure-relief valve 66 may be affected by both an actual operating pressure associated with the hydraulic retarder 12, as well as the operator or electronic control. More specifically, the retarder-pressure-relief valve 66 may further be controlled by pressure selectively applied from the solenoid valve 114, and pressure from the output of the hydraulic retarder 12. Pressure provided through the solenoid valve 114 may likewise be applied to the retarder-pressure-relief valve spool 160 by way of actuation conduits 117, 118, a signaled operator or electronic control causing fluid pressure to be applied to the valve spool 160 at one end to move the valve spool 160 against the biasing force of the spring 122. Similarly, fluid pressure from the retarder-out conduit 70 may be applied to the opposite end of the retarder-pressure-relief valve spool 160 by way of pressure take-offs 77, 79 to apply pressure in association with the spring 122. In this way, the degree to which the retarder-pressure-relief valve 66 is opened may controlled to selectively bleed fluid from the first-retarder-in conduit 52, and, therefore, to control the level of retarding provided by the hydraulic retarder 12.

Figure 4:
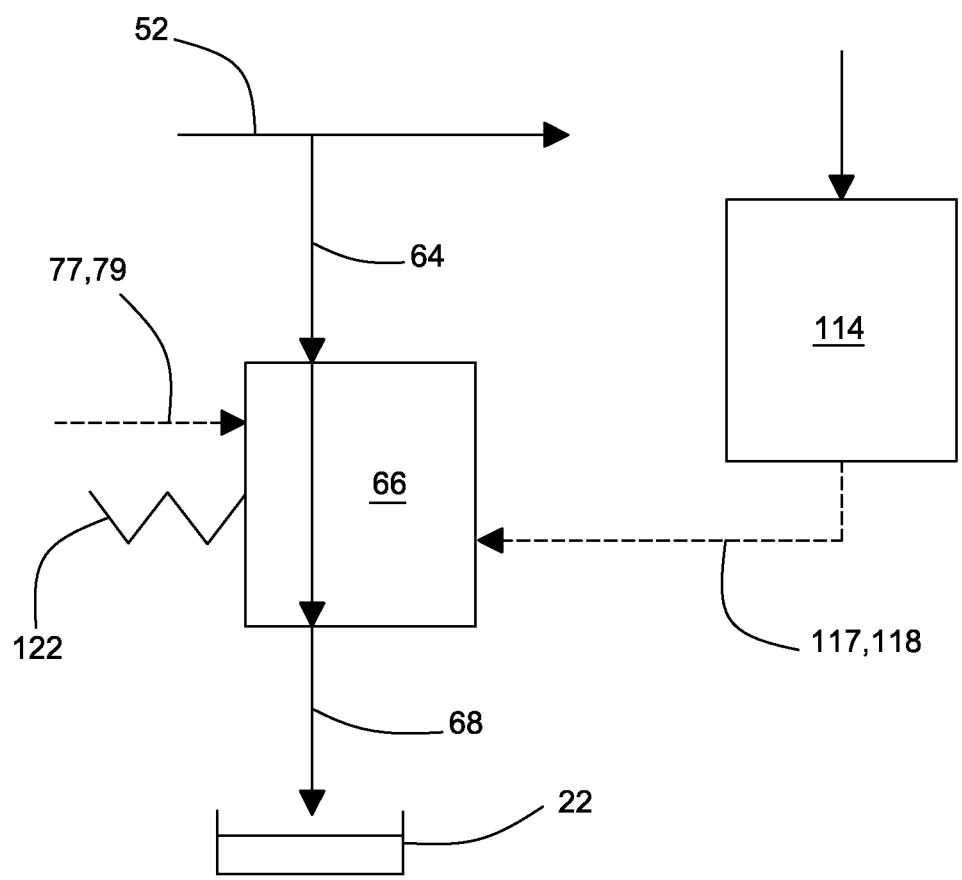
FIG. 4 is an embodiment of a retarder-pressure-relief valve of the apparatus and system of FIGS. 1-3.

An exemplary retarder-pressure-relief valve 66 is illustrated in FIG. 4. As the pressure of flow through the retarder-out conduit 70 increases with increasing pressure of the first-retarder-in conduit 52 and the pressure-relief line 64, the pressure take-offs 77, 79 from the retarder-out conduit 70 and the force of spring 122 move the retarder-pressure-relief valve 66 to the open position, allowing pressure relief flow through relief conduit 68 to the tank 22. With increasing current to the solenoid valve 114, however, pressure builds through actuation conduits 117, 118. As a result, pressure from actuation conduit 118 is applied against that of the pressure take-offs 77, 79 and spring 122, reducing or eliminating flow through the retarder-pressure-relief valve 66. As flow through the retarder-pressure-relief valve 66 is reduced, pressure in the first-retarder-in conduit 52 increases, with a corresponding increase in pressure within the hydraulic retarder 12 to increase the associated hydraulic retarding.

Returning to FIGS. 1-3, the fill-switch valve 40 may be operated in a similar manner. In order to controllably or selectively initiate the "fast fill" condition, pressure from the solenoid valve 114 may be applied to the fill-switch valve spool 140 against the force of the spring 128 by way of actuations conduits 117, 119. As with the retarder-pressure-relief valve 66, the force of the spring 128 opposing actuation may be supplemented by the pressure from the output of the hydraulic retarder 12 by way of pressure take-offs 77, 78. In this way, actuation of the solenoid valve 114 to provide pressure through actuation conduits 117, 119 to the fill-switch valve spool 140 moves the fill-switch valve spool 140 to the right, i.e., the "fast fill" position of FIG. 3, closing off flow from the main pump 18 and torque converter 14 to lube 58. In this way, flow entering the fill-switch valve 40 through port 144 (i.e., directed by the retarder flow valve 16 from the main pump 18) is directed through port 145 to the second-retarder-in conduit 74, supplementing flow through the first-retarder-in conduit 52. As the hydraulic retarder 12 fills, and pressure increases at the retarder-out conduit 70, pressure increases through the pressure take-offs 77, 78, causing the force of the spring 128 and the pressure through the pressure take-offs 77, 78 to move the fill-switch valve spool 140 from the "fast fill" position illustrated in FIG. 3 to the position illustrated in FIGS. 1 and 2 for normal operation of the hydraulic retarder 12.

Figure 5:
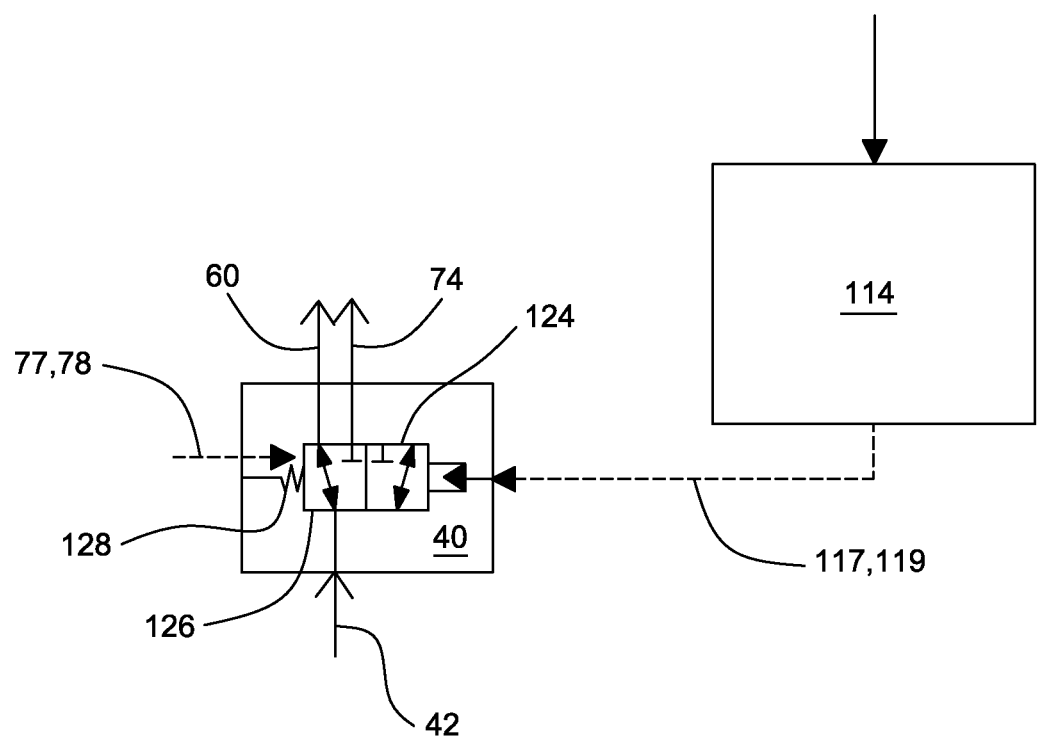
FIG. 5 is an embodiment of a fill-switch valve of the apparatus and system of FIGS. 1-3.

An exemplary fill-switch valve 40 is illustrated in the schematic of FIG. 5. Flow is provided from the torque converter 14 and the main pump 18 through torque-converter-out conduit 35 and the retarder flow valve 16 to the fill-switch-valve-in conduit 42 (see FIGS. 1-3). Flow from the fill-switch-valve-in conduit 42 is directed to either the second-retarder-in conduit 74 when the fill-switch valve 40 is in the "fast fill" position 124 (see FIG. 3), or the lube-in conduit 60 and then to lube 58 when the fill-switch valve 40 is in the lube position 126 (see FIGS. 1 and 2).

The fill-switch valve 40 illustrated in FIG. 5 is biased to the lube position 126 by, for example, spring 128. Thus, during all conditions other than the "fast fill" condition, flow from the main pump 18 and the torque converter 14 is directed to lube 58, the fill-switch valve 40 being in its lube position 126. As the solenoid valve 114 is directed to fill the hydraulic retarder 12, pressure from the solenoid valve 114 through actuation conduits 117, 119 causes the fill-switch valve 40 to move to the "fast fill" position 124, causing flow from the main pump 18 and the torque converter 14 to be directed to the second-retarder-in conduit 74. In this way, flow to the hydraulic retarder 12 is supplemented by flow from the main pump 18 to assist in initial rapid fill of the hydraulic retarder 12.

As pressure builds within the hydraulic retarder 12 during filling, pressure within the retarder-out conduit 70 increases. This pressure within the retarder-out conduit 70 is applied to the fill-switch valve 40 via pressure take-offs 77, 78 to supplement the force of the spring 128. As pressure in the retarder-out conduit 70 and, consequently, pressure take-off 78 builds, the pressure applied to the fill-switch valve spool 140 moves the fill-switch valve 40 back to its lube position 126. As a result, when the hydraulic retarder 12 is filled, the pressure in the retarder-out conduit 70 and pressure take-offs 77, 78 shifts the fill-switch valve 40 to cause flow from the main pump 18 to be redirected to lube 58 by way of the lube-in conduit 60. The hydraulic retarder 12 is then operated based upon flow from the retarder pump 20 through retarder-pump-out conduit 50, the retarder flow valve 16, and the first-retarder-in conduit 52, along with cooled return flow from the cooler 44 by way of the cooler-out conduit 48, the retarder flow valve 16, and the first-retarder-in conduit 52. The hydraulic retarder 12 is further modulated, as discussed above, by operation of the retarder-pressure-relief valve 66 to control the pressure in the first-retarder-in conduit 52.

Figure 6:
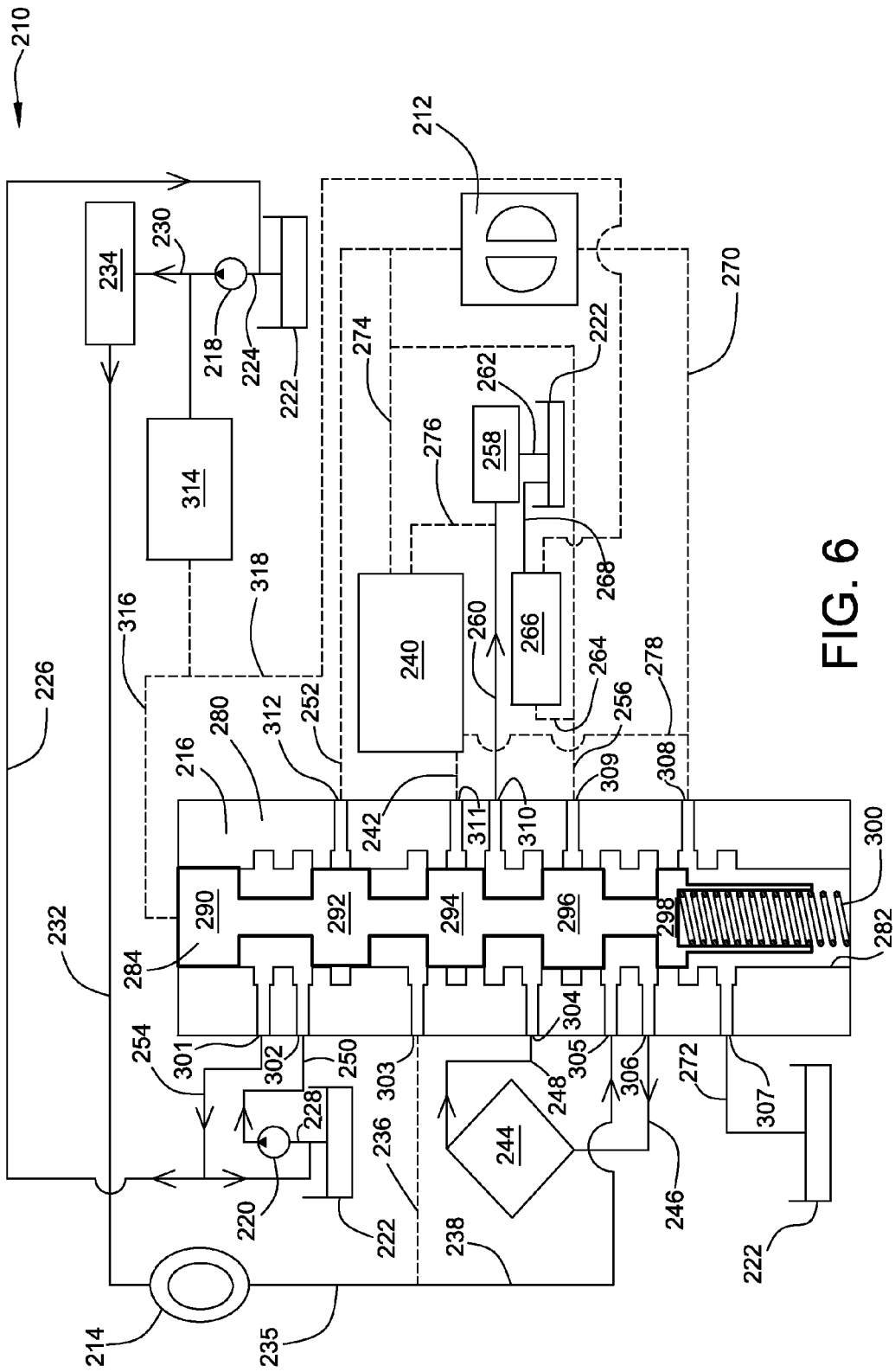
FIG. 6 is a schematic representation partly in block diagram form showing an alternate embodiment of a hydraulic retarder control system according to aspects of this disclosure, the retarder being off.
Figure 7:
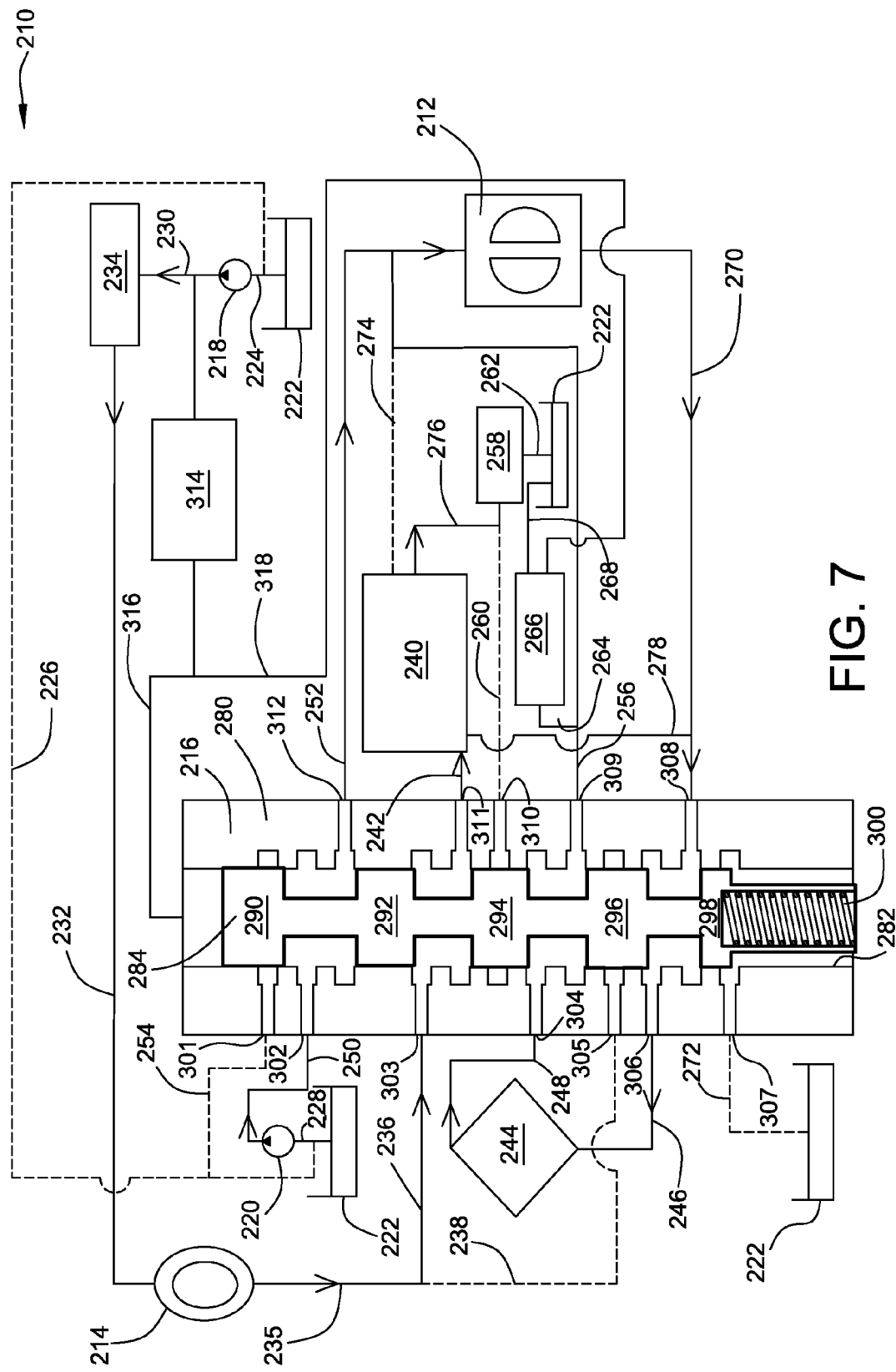
Figure 8:
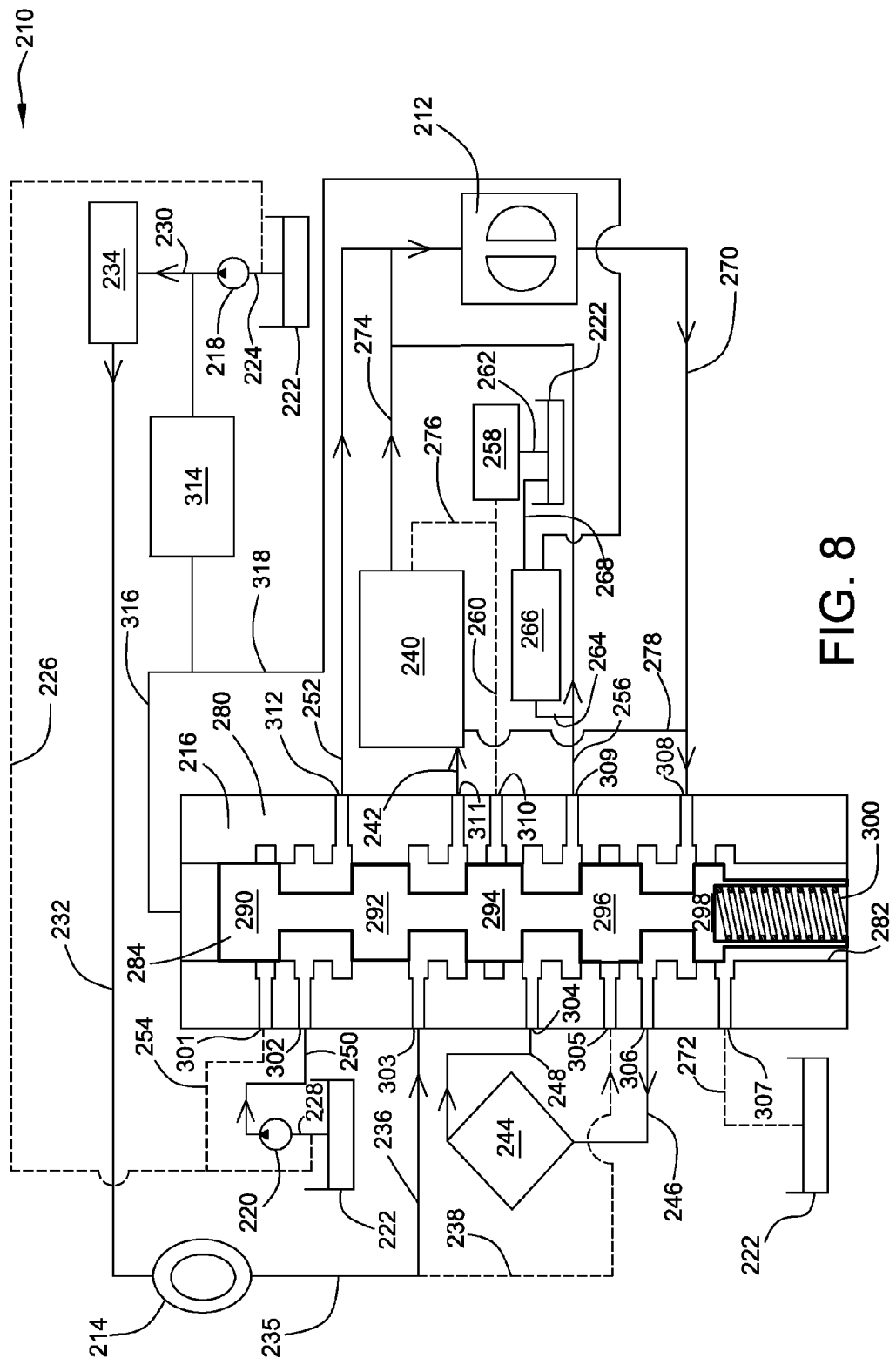
FIG. 8 is the schematic representation of FIG. 6 in a rapid fill configuration.

A further embodiment of a transmission hydraulic retarder control system 210 is illustrated in FIGS. 6-8. As with the first embodiment, FIG. 6 illustrates the system 210 in a "retarder off" condition; FIG. 7 illustrates the system 210 in a "retarder on" condition; and FIG. 8 illustrates the system 210 in a "fast fill" condition.

Referring to FIG. 6, the hydraulic retarder control system 210 provides control of hydraulic fluid flow to a hydraulic retarder 212 as well as a torque converter 214 in connection with a transmission (not further illustrated). The hydraulic retarder control system 210 further includes a retarder flow valve 216. It will be appreciated, however, that the retarder flow valve 216 may alternately be a plurality of valves (not illustrated) directed to the various flows through the retarder flow valve 216. The illustrated retarder flow valve 216 includes a valve body 280 having a valve bore 282 in which a valve spool 284 is slidably disposed. The valve spool 284 has a plurality of equal diameter lands 290, 292, 294, 296, 298 disposed along its length. The valve spool 284 is urged in an upward direction as illustrated in FIGS. 1-3 by a spring 300. The valve body 280 includes a plurality of inlet and exhaust ports 301-312 that are fluidly connected to the various conduits described throughout this disclosure. Movement of the valve spool 284 causes the lands, 290, 292, 294, 296, 298 to block or connect the ports 301-312 to direct flow through the retarder flow valve 216.

According to another feature of the hydraulic retarder control system 210, a plurality of pumps 218, 220 is provided. While a main pump 218 and a retarder pump 220 are illustrated as separate pumps, the main pump 218 and retarder pump 220 could alternately be housed in a single housing (not illustrated), providing economies in packaging and assembly. Both the main pump 218 and the retarder pump 220 may draw fluid from and/or return fluid to tank 222 by way of one or more conduits 224, 226, 228. While the reference number 222 is utilized throughout as a designation for the tank, it will be appreciated that one or more tanks may be provided.

The retarder pump 220 may selectively supply fluid from tank 222 to the retarder flow valve 216 by way of retarder-pump-out conduit 250. Depending upon the position of the valve spool 284 of the retarder flow valve 216, fluid from retarder-pump-out conduit 250 may be selectively directed toward the hydraulic retarder 212 by way of first-retarder-in conduit 252 (see FIGS. 7 and 8), or returned to the tank 222 by way of retarder-pump-return conduit 254 (see FIG. 6).

More specifically, when the hydraulic retarder 212 is off, the valve spool 284 is in the "retarder off" position illustrated in FIG. 6. In this "retarder off" position, lands 290, 292 are positioned with the land 292 blocking port 312 with port 301 being open, such that fluid from the retarder pump 220 provided through the retarder-pump-out conduit 250 and port 302 is directed through port 301 to retarder-pump-return conduit 254. Conversely, if when the hydraulic retarder 212 is on, the valve spool 284 is in the "retarder on" position illustrated in FIGS. 7 and 8. In this "retarder on" position, lands 290, 292 are positioned with land 290 blocking port 301 with port 312 being open, such that fluid from the retarder pump 220 provided through the retarder-pump-out conduit 250 and port 302 is directed through port 312 to the first-retarder-in conduit 252 and on to the hydraulic retarder 212.

When the valve spool 284 is disposed in the "retarder off" position, that is, the upward position, as illustrated in FIG. 6, retarder out pressure from a retarder-out conduit 270 may drain to the retarder flow valve 216 at port 308, pressure being applied to the land 298 in conjunction with the biasing force of spring 300. In order to move the valve spool 284 of the retarder flow valve 216 to a "retarder on" position, as illustrated in FIGS. 7 and 8, a selectively actuable solenoid valve 314 is provided. Upon application of braking requiring hydraulic retarding, pressure from a main-pump-out conduit 230 is selectively applied through the solenoid valve 314 and actuation conduit 316 to the land 290 of the valve spool 284, resulting in a downward shift in the valve spool 284 against the force of spring 300.

According to a feature of the system 210, fluid from the main pump 218 may be used to supplement the flow to the hydraulic retarder 212 during initial filling operations of the hydraulic retarder 212, or to an alternate use, such as to lube 258, or to a cooler 244 and on to lube 258. Fluid from lube 258 may be further directed to tank 222 by way of lube-out conduit 262. The main pump 218 may selectively draw fluid from the tank 222 by way of conduit 224, and supply fluid to the torque converter 214 by way of the main-pump-out conduit 230 and torque-converter-in conduit 232 as directed by fluid control valves 234. Fluid from the torque converter 214 is directed to the retarder flow valve 216 by way of torque-converter-out conduits 235, 236 to port 303 or by way of torque-converter-out conduits 235, 238 to port 305. The retarder flow valve 216 may direct fluid from the torque converter 214 and torque-converter-out conduit 236 toward a fill-switch valve 240 by way of fill-switch-valve-in conduit 242 (see FIG. 7), or from the torque converter 214 and torque-converter-out conduit 238 to the cooler 244 by way of a cooler-in conduit 246.

More specifically, when the hydraulic retarder 212 is off, as illustrated in FIG. 6, the valve spool 284 is in the "retarder off" position illustrated in FIG. 6. In this "retarder off" position, lands 292, 294 are positioned such that flow is arrested from torque-converter-out conduit 236 when the retarder-flow valve volume adjacent port 303 is full. Lands 296, 298 are positioned such that flow from torque-converter-out conduit 238 enters the retarder flow valve 216 through port 305, and exits the retarder flow valve 216 through port 306. Fluid from the torque converter 214 then proceeds to a cooler 244 through the cooler-in conduit 246. Cooled fluid from the cooler 244 is directed to port 304 of the retarder flow valve 216 by way of a cooler-out conduit 248. Lands 294, 296 of the valve spool 284 are positioned such that the cooled fluid is then directed through port 310 to lube 258 through lube-in conduit 260.

When retarding is required, the valve spool 284 of the retarder flow valve 216 moves to the "retarder on" position illustrated in FIG. 7, as will be discussed further below. With land 296 blocking port 305, flow through the torque-converter-out conduit 238 is arrested, and flow from the torque converter 214 proceeds through torque converter outlet conduit 236 to now open port 303. In this "retarder on" position, lands 292, 294 are positioned such that fluid from port 303 proceeds through port 311 to the fill-switch valve 240 by way of fill-switch-valve-in conduit 242.

Further flow of the fluid from the torque converter 214 is then directed by the position of the fill-switch valve 240. More specifically, during initial filling operations, the fill-switch valve 240 directs fluid to the hydraulic retarder 212 by way of a second-retarder-in conduit 274 (see FIG. 8). In this way, flow from the main pump 218 supplied to the torque converter 214 supplements the flow from the retarder pump 220 to the hydraulic retarder 212, allowing for a more rapid fill process. Turning to FIG. 7, when the hydraulic retarder 212 is adequately filled, the fill-switch valve 240 may then discontinue this supplemental flow to the hydraulic retarder 212, and direct flow from the torque converter 214 to lube 258 by way of fill-switch-valve-out conduit 276.

When the hydraulic retarder 212 is not operational, as illustrated in FIG. 6, fluid from the hydraulic retarder 212 may be drained to the tank 222 by way of retarder-out conduit 270, the retarder flow valve 216, and drain conduit 272. When the hydraulic retarder 212 is operational, that is, with the valve spool 284 positioned as illustrated in FIGS. 7 and 8, fluid from the hydraulic retarder 212 is returned to the cooler 244 by way of retarder-out conduit 270, the retarder flow valve 216, and cooler-in conduit 246 during operation of the hydraulic retarder 212. By way of a cooler-out conduit 248, cooled fluid from the cooler 244 may be directed back to the retarder flow valve 216 to be returned to the hydraulic retarder 212 by way of a third-retarder-in conduit 256, as illustrated in FIGS. 7 and 8. High-pressure fluid from third-retarder-in conduit 256 may likewise be directed to the tank 222 by way of pressure-relief line 264 to retarder-pressure-relief valve 266 and on to relief conduit 268.

Returning to the fill-switch valve 240, as explained above, fluid is provided to the fill-switch valve 240 from the torque convertor 214 by way of torque-converter-out conduits 235, 236, the retarder flow valve 216, and fill-switch-valve-in conduit 242. The fill-switch valve 240 may direct fluid from fill-switch-valve-in conduit 242 to either the hydraulic retarder 212 by way of the second-retarder-in conduit 274, or to lube 258 by way of fill-switch-valve-out conduit 276. The position of the fill-switch valve 240 is determined by a pressure take-off 278 from the retarder-out conduit 270 from the hydraulic retarder 212. As the pressure in the retarder-out conduit 270 increases, the pressure within the pressure take-off 278 causes a shift in the fill-switch valve 240 to redirect flow from the hydraulic retarder 212 by way of the second-retarder-in conduit 274, to lube 258 by way of fill-switch-valve-out conduit 276. Thus, fluid from the main pump 218 provided to the torque converter 214 may be directed to the hydraulic retarder 212 when additional flow is required, as during fast fill operations. When the hydraulic retarder 212 is filled and operational, the fill-switch valve 240 is shifted as a result of the pressure take-off 278 from the retarder-out conduit 270, and the fluid from the main pump 218 provided to the torque converter 214 may be directed to lube 258 by way of fill-switch-valve-out conduit 276.

Figure 9:
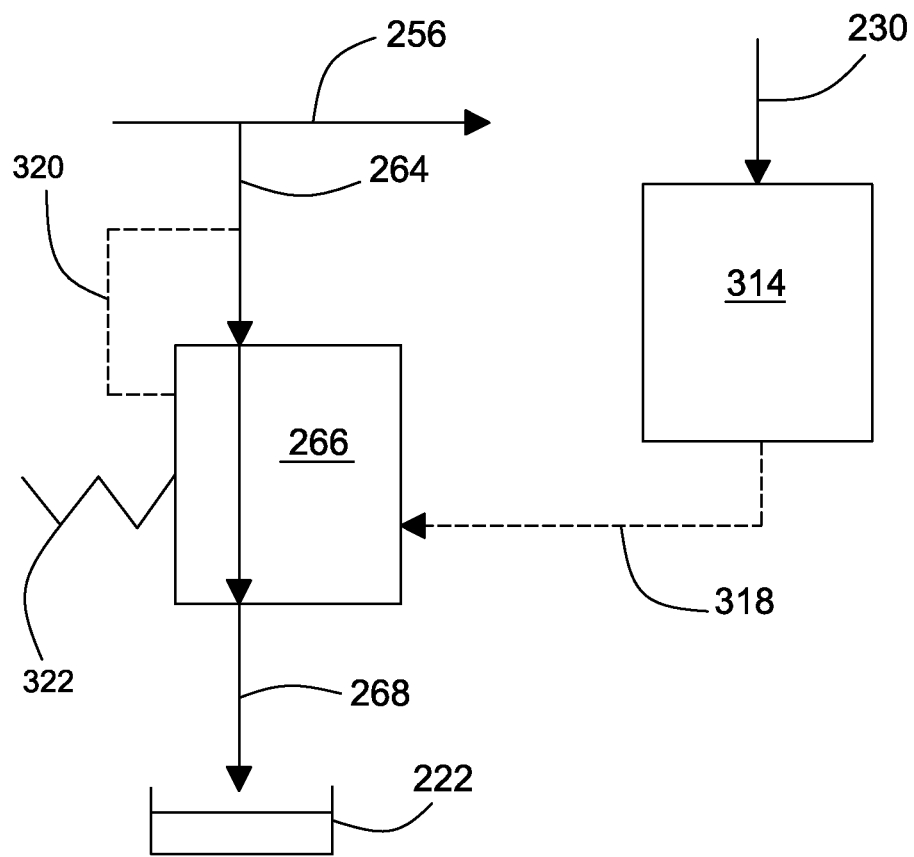
FIG. 9 is an embodiment of a retarder-pressure-relief valve of the apparatus and system of FIGS. 6-8.

In order to relieve pressure in flow to the hydraulic retarder 212, the solenoid valve 314 may likewise apply actuating pressure from the main-pump-out conduit 230 to the retarderpressure-relief valve 266 through actuation conduit 318. An exemplary retarder-pressure-relief valve 266 is illustrated in FIG. 9. As the pressure of flow through the third-retarder-in conduit 256 and pressure-relief line 264 increases, the pressure in pressure take-off 320 and the force of spring 322 move the retarder-pressure-relief valve 266 to the open position illustrated, allowing pressure relief flow through relief conduit 268 to the tank 222. With increasing current to the solenoid valve 314, however, pressure builds through actuation conduit 318. As a result, pressure from actuation conduit 318 is applied against that of the pressure take-off 320 and spring 322, reducing or eliminating flow through the retarder-pressure-relief valve 266. As flow through the retarder-pressure-relief valve 266 is reduced, pressure in the third-retarder-in conduit 256 increases, with a corresponding increase in pressure within the hydraulic retarder 212 to increase the associated hydraulic retarding.

Figure 10:
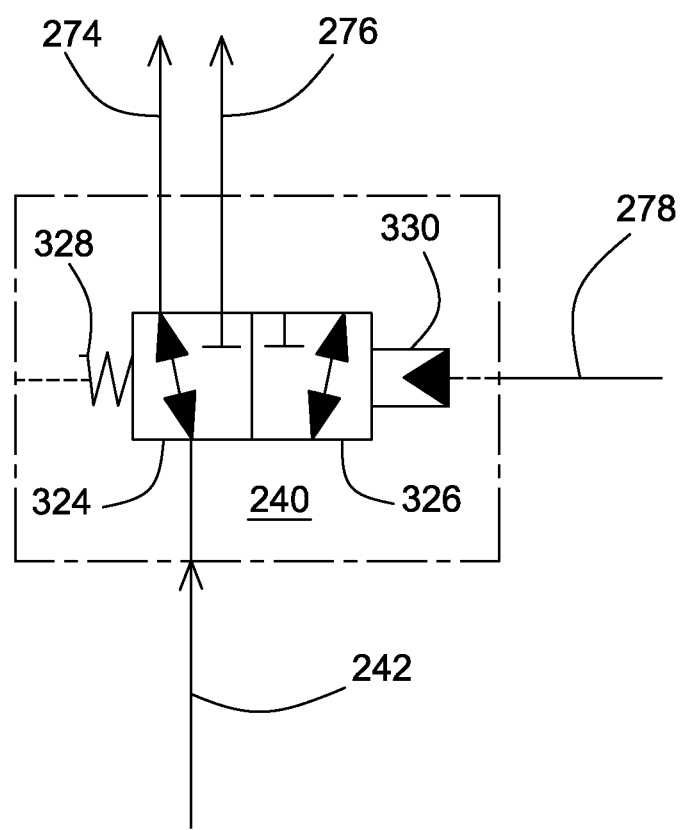
FIG. 10 is an embodiment of a fill-switch valve of the apparatus and system of FIGS. 6-8.

An exemplary fill-switch valve 240 is illustrated in greater detail in FIG. 10. Flow is provided from the torque converter 214 and the main pump 218 through torque-converter-out conduits 235, 236 and the retarder flow valve 216 to the fill-switch-valve-in conduit 242 (see FIGS. 7 and 8). Flow from the fill-switch-valve-in conduit 242 is directed to either the second-retarder-in conduit 274 when the fill-switch valve 240 is in the first position 324, or the fill-switch-valve-out conduit 276 and then to lube 258 (see FIGS. 7 and 8) when the fill-switch valve 240 is in the second position 326.

The fill-switch valve 240 illustrated in FIG. 10 is biased to the first position 324 by, for example, spring 328. Thus, when there is no flow from the main pump 218, the fill-switch valve 240 is in its first position 324. As flow from the main pump 218 reaches the fill-switch valve 240 biased in its first position 324, the fill-switch valve 240 directs flow from the main pump 218 by way of fill-switch-valve-in conduit 242 to the hydraulic retarder 212 by way of the second-retarder-in conduit 274 to assist in initial rapid fill of the hydraulic retarder 212. As pressure builds within the hydraulic retarder 212 during filling, pressure within the retarder-out conduit 270 increases. This pressure within the retarder-out conduit 270 is applied to the fill-switch valve 240 via pressure take-off 278. As pressure in the retarder-out conduit 270 and, consequently, pressure take-off 278 builds, the pressure applied to the fill-switch valve 240 at 330 overcomes the force applied by spring 328, moving the fill-switch valve 240 to its second position 326. As a result, the when the hydraulic retarder 212 is filled and the pressure in the retarder-out conduit 270 and pressure take-off 278 shifts the fill-switch valve 240 to cause flow from the main pump 218 to be redirected to lube 258 by way of the fill-switch-valve-out conduit 276. The hydraulic retarder 212 is then operated based upon flow from the retarder pump 220 through retarder-pump-out conduit 250, the retarder flow valve 216, and the first-retarder-in conduit 252, along with cooled return flow from the cooler 244 by way of the cooler-out conduit 248, the retarder flow valve 216, and the third-retarder-in conduit 256. The hydraulic retarder 212 is further modulated, as discussed above, by operation of the retarder-pressure-relief valve 266 to control the pressure in the third-retarder-in conduit 256.

While the fill-switch valve 240 and the retarder-pressure-relief valve 266 are illustrated as two separate valves, it will be appreciated that they may ultimately be combined as a single valve or within a single housing.

A command for operation of the hydraulic retarder 12, 212 may be provided to the solenoid valve 114, 314 and control valves 234. Operation of the solenoid valve 114, 314 and control valves 234 may be directed by one or more control modules (not shown), which provide a command indicative of a desired operating condition of the hydraulic retarder 12, 212. The one or more control modules may be of any conventional design having hardware and software configured to perform the logic and send and receive appropriate signals to perform the disclosed logic. An electronic control module may include one or more controller units (not shown), and may be configured solely to perform the disclosed strategy, or to perform the disclosed strategy and other processes of the machine. The control module be of any suitable construction, and may include a processor (not shown) and a memory component (not shown). The processor may be microprocessors or other processors as known in the art. In some embodiments, the processor may be made up of multiple processors. Typically, the processor will have associated therewith long-term (non-volatile) memory for storing the program instructions, as well as short-term (volatile) memory for storing operands and results during (or resulting from) processing.

Instructions associated with the disclosed strategy may be read into or incorporated into a computer readable medium, such as the memory component or provided external to processor. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium or combination of media that participates in providing instructions to processor for execution. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer or processor can read. The memory component may include any form of computer-readable media as described above. The memory component may include multiple memory components.

INDUSTRIAL APPLICABILITY

This disclosure relates to a transmission hydraulic retarder control system 10, 210 for a mobile machine (not shown). The system 10, 210 has universal applicability in various types of machines. The term "machine" may refer to any machine that performs some type of operation associated with an industry such as mining, construction, farming, transportation, or any other industry known in the art. For example, the machine may be an earth-moving machine, such as a wheel loader, excavator, dump truck, backhoe, motor grader, material handler or the like. Moreover, one or more implements may be connected to the machine. Such implements may be utilized for a variety of tasks, including, for example, brushing, compacting, grading, lifting, loading, plowing, ripping, and include, for example, augers, blades, breakers/hammers, brushes, buckets, compactors, cutters, forked lifting devices, grader bits and end bits, grapples, blades, rippers, scarifiers, shears, snow plows, snow wings, and others.

The disclosed transmission hydraulic retarder control system 10, 210 provides dual pumps 18, 218, 220 that may provide separate flow circuits for transmission hydraulics and constant flow to the hydraulic retarder 12, 212 on. The fill-switch valve 40, 240 provides additional flow from the main pump 18, 218 during filling of the hydraulic retarder 12, 212, which may provide rapid filling and availability of hydraulic retarding to supplement braking functions. This additional flow may eliminate the need for an accumulator. When the hydraulic retarder 12, 212 is filled and on, the fill-switch valve 40, 240 switches flow from the main pump 18, 218 to lube 58, 258.

Figure 11:
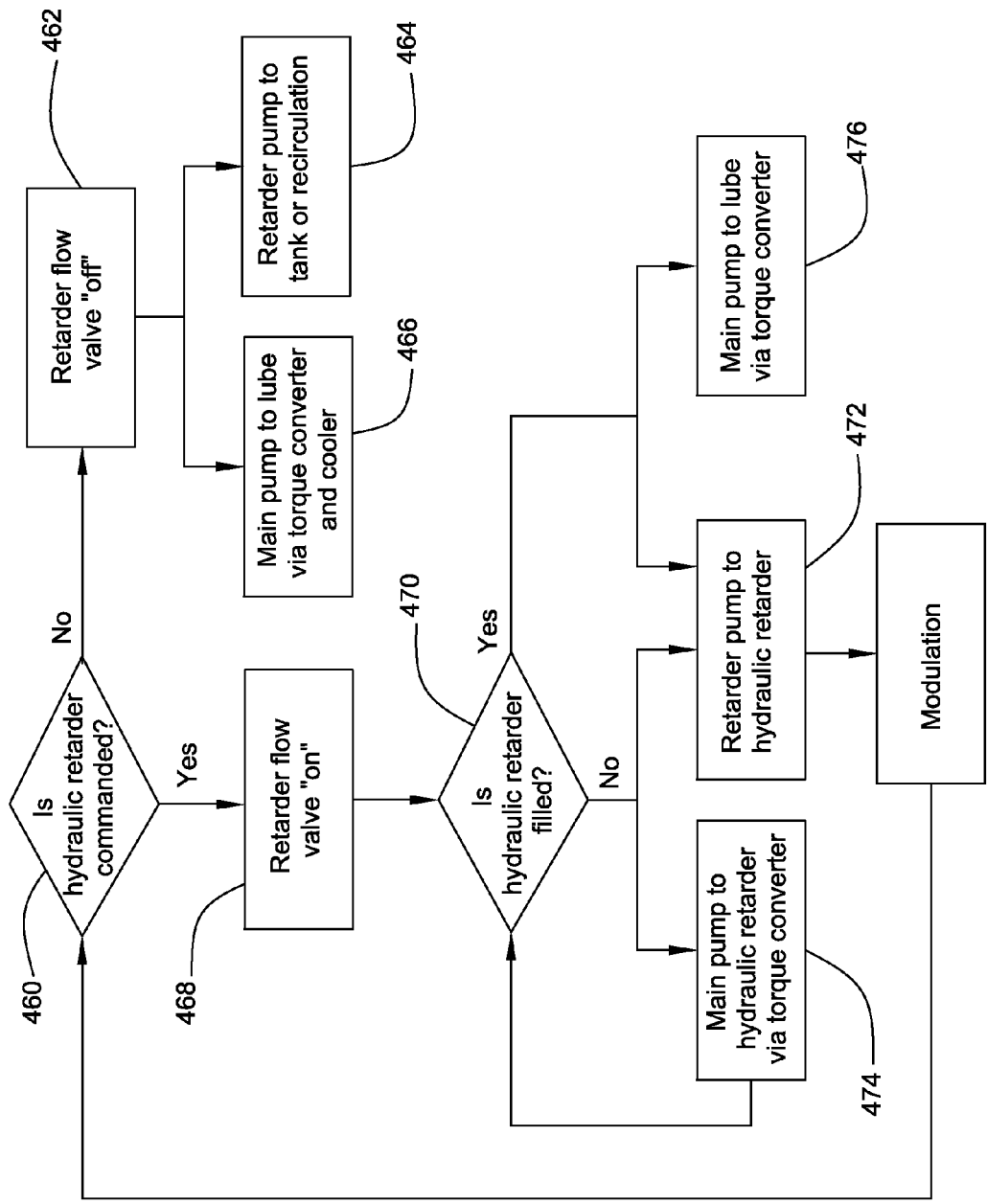
FIG. 11 is a logic diagram for operation of the control system of FIGS. 1-3 and 6-8.

A logic chart for off, on, and fill of the hydraulic retarder 12, 212 is provided in FIG. 11. As indicated by block 460, if the hydraulic retarder 12, 212 is not commanded, the retarder flow valve 16, 216 remains in the retarder off position (block 462). As a result, flow from the retarder pump 20, 220 is directed to recirculation or tank 22, 222 (block 464), flow from the main pump 18, 218 is directed to lube 58, 258 or via the torque converter 14, 214 and the cooler 44, 244 (block 466). Conversely, when the hydraulic retarder 12, 212 is indicated, flow from the solenoid valve 114, 314 causes the retarder flow valve 16, 216 to shift to the retarder on position (block 468), and resulting flow in the system 10, 210 is dependent upon whether the hydraulic retarder 12, 212 is filled and ready for operation (block 470). While flow from the retarder pump 20, 220 is directed to the hydraulic retarder 12, 212 via fill-switch valve 40, 240 whether or not the hydraulic retarder 12, 212 is filled (block 472), flow from the main pump 18, 218 is dependent upon whether the hydraulic retarder 12, 212 is filled. If the hydraulic retarder is not filled, flow from the main pump 18, 218 is directed to the hydraulic retarder 12, 212 via the torque converter 14, 214 and the fill-switch valve 40, 240 (block 474). Flow from the main pump 18, 218 continues to fill the hydraulic retarder 12, 212 until such time as the pressure within the retarder-out conduit 70, 270 reaches a preset pressure, indicating that the hydraulic retarder 12, 212 is filled. When the pressure in the retarder-out conduit 70, 270 reaches the preset pressure, the fill-switch valve 40, 240 redirects the flow from the main pump 18, 218 via the torque converter 14, 214 to lube 58, 258 (block 476). The hydraulic retarder 12, 212 if further modulated by at least one of the retarder-pressure-relief valve 66, 266 (block 478).

The retarder-pressure-relief valve 66, 266 being independent of the retarder flow valve 16, 216 may allow separate control of flow and retarding torque within the hydraulic retarder 12, 212. Exhausting the retarder-pressure-relief valve 66, 266 to tank 22, 222 rather than to lube 58, 258 may enhance control at low retarding levels. In some embodiments, the retarder-pressure-relief valve 66, 266 and the retarder modulation valve 134 are relatively insensitive to flow.

In some modes of operation of some embodiments, fluid cooled by the cooler 44, 244 flows to the tank 22, 222, mixing with uncooled fluid from lube 58, 258.

The disclosed transmission hydraulic retarder control system 10, 210 may require only a single cooler 44, 244.

In some embodiments, one or more of the retarder flow valve 16, 216, the fill-switch valve 40, 240, and the retarder-pressure-relief valve 66, 266 are spool valves, which may reduce or minimize the number of valves of the system 10, 210.

Some embodiments may provide improved manufacturability over current designs.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A method of operating a hydraulic retarder in a mobile machine including a transmission having a torque converter, the method comprising:
   when the hydraulic retarder is turned off,
      providing fluid from a main pump to the torque converter,
      providing fluid from the torque converter to at least one of a secondary operation and a tank, and
      at least one of recirculating fluid from a retarder pump back to the retarder pump, and providing fluid from the retarder pump to the tank, and
   when the hydraulic retarder is turned on,
      providing fluid from the retarder pump to the hydraulic retarder,
      providing fluid from the torque converter to the hydraulic retarder until such time as the hydraulic retarder is full,
      providing fluid from the torque converter to at least one of the secondary operation and the tank when the torque converter is filled,
   moving a retarder-flow valve to a retarder on position in response to a command for operation of the hydraulic retarder,
   providing fluid from the retarder pump through the retarder-flow valve to the hydraulic retarder when the retarder-flow valve is in the retarder on position,
   providing fluid from the torque converter through the retarder-flow valve to at least one of the hydraulic retarder, the secondary operation, and the tank,
   providing a signal indicative of a commanded operating condition of the hydraulic retarder to a solenoid valve, and providing flow through the solenoid valve to the retarder-flow valve to move the retarder-flow valve to the retarder on position in response to the commanded operating condition of the hydraulic retarder.

2. The method of claim 1 further including:
providing fluid from the torque converter through the retarder-flow valve to a fill-switch valve, and
providing fluid through the fill-switch valve to the at least one of the hydraulic retarder, the secondary operation, and the tank.

3. The method of claim 2 further including:
actuating the fill-switch valve to direct flow from the retarder-flow valve to the at least one of the secondary operation or the tank when a pressure in a retarder-out conduit reaches a preset pressure.

4. The method of claim 3 further including:
directing pressure from the retarder-out conduit to actuate the fill-switch valve to direct flow from the retarder-flow valve to the at least one of the secondary operation or the tank.

5. The method of claim 3 further including:
modulating operation of the hydraulic retarder by modulating operation of a retarder-pressure-relief valve fluidly coupled upstream the hydraulic retarder.

6. The method of claim 1 further including:
modulating operation of the hydraulic retarder by modulating operation of a retarder-pressure-relief valve fluidly coupled upstream the hydraulic retarder.

7. A transmission hydraulic retarder control system for controlling fluid to a hydraulic retarder associated with a transmission, the hydraulic retarder being adapted to selectively provide retarding functions when on and not provide retarding functions when off, the transmission including a torque converter, the control system comprising
at least one tank,
at least one secondary operation,
a cooler,
a retarder pump,
at least one valve fluidly coupled to selectively direct fluid from the retarder pump to the hydraulic retarder when the hydraulic retarder is providing retarding functions, and to at least one of the tank and recirculation to the retarder pump when the hydraulic retarder is not providing retarding functions,
a main pump fluidly coupled to provide fluid to the torque converter,
said at least one valve fluidly coupled to selectively direct fluid from the torque converter to the cooler when the hydraulic retarder is off, direct fluid from the torque converter to the hydraulic retarder when the hydraulic retarder is on but not filled, and to direct fluid from the torque converter to at least one of the tank or the at least one secondary operation when the hydraulic retarder is on and filled,
a retarder-flow valve, the retarder-flow valve including the at least one valve fluidly coupled to selectively direct fluid from the retarder pump and the at least one valve fluidly coupled to selectively direct fluid from the torque converter, and
a fill-switch valve fluidly disposed between the retarder-flow valve and the hydraulic retarder, the retarder-flow valve selectively directing fluid flow from the torque converter to the fill-switch valve when the torque converter is on, the fill-switch valve being adapted to selectively direct fluid to the hydraulic retarder when the hydraulic retarder is on but not filled and to at least one of the tank and the at least one secondary operation when the hydraulic retarder is filled.

8. The control system of claim 7 wherein a retarder-out conduit is fluidly coupled to the hydraulic retarder and the retarder-flow valve, and is operable to direct flow from the hydraulic retarder to the cooler when the hydraulic retarder is on.

9. The control system of claim 7 further including a retarder-out conduit fluidly coupled to the hydraulic retarder downstream the hydraulic retarder, and a pressure take-off from the retarder-out conduit to direct fluid pressure to operate the fill-switch valve when the fluid pressure in the retarder-out conduit reaches a preset pressure, the fill-switch valve switching flow from the retarder-flow valve from the hydraulic retarder to the at least one of the tank and the at least one secondary operation when the fluid pressure in the fluid take-off reaches the preset pressure.

10. The control system of claim 7 further including a solenoid valve selectively operable to move the retarder-flow valve from a retarder off position to a retarder on position.

11. The control system of claim 7 wherein the retarder-flow valve is operable to direct flow from the torque converter to the cooler when the hydraulic retarder is off, and to direct cooled fluid from the cooler to the hydraulic retarder when the hydraulic retarder is on.

12. The control system of claim 11 further including a retarder-in conduit and a retarder-pressure-relief valve, the retarder-in conduit being fluidly coupled to provide fluid flow to the hydraulic retarder, the retarder-pressure-relief valve being selectively operable to bleed fluid flow from the retarder-in conduit to the tank to modulate operation of the hydraulic retarder.

13. The control system of claim 7 further including a retarder-in conduit and a retarder-pressure-relief valve, the retarder-in conduit being fluidly coupled to provide fluid flow to the hydraulic retarder, the retarder-pressure-relief valve being selectively operable to bleed fluid flow from the retarder-in conduit to the tank to modulate operation of the hydraulic retarder.

14. The control system of claim 13 further including a retarder-out conduit fluidly coupled to the hydraulic retarder downstream the hydraulic retarder, and a pressure take-off from the retarder-out conduit to direct fluid pressure to operate the retarder-pressure-relief valve when fluid pressure in the retarder-out conduit reaches a preset pressure.

15. A transmission hydraulic retarder control system for controlling fluid to a hydraulic retarder associated with a transmission, the hydraulic retarder being adapted to selectively provide retarding functions when on and not provide retarding functions when off, the transmission including a torque converter, the control system comprising
at least one tank,
at least one lube operation,
a cooler,
a retarder pump,
a main pump fluidly coupled to provide fluid to the torque converter, and
a retarder-flow valve, and
a fill-switch valve,
the retarder-flow valve fluidly coupled to the torque converter, the hydraulic retarder, the cooler, the at least one lube operation, the retarder pump, and the fill-switch valve, the retarder-flow valve being adapted and fluidly coupled
to selectively direct fluid from the torque converter to the cooler when the hydraulic retarder is off, and to direct fluid from the torque converter to the fill-switch valve when the hydraulic retarder is on, and to selectively direct fluid from the retarder pump to the hydraulic retarder when the hydraulic retarder is on, and to direct fluid from the retarder pump to at least one of the retarder pump and the tank when the hydraulic retarder is off, the fill-switch valve being adapted and fluidly coupled to direct fluid from the retarder-flow valve to the hydraulic retarder when the hydraulic retarder is on but not filled, and to direct fluid from the retarder-flow valve to at least one of the tank and the at least one lube operation when the hydraulic retarder is on and filled.

16. The control system of claim 15 further including a retarder-in conduit fluidly coupled to provide fluid to the hydraulic retarder and a retarder-pressure-relief valve, the retarder-pressure-relief valve being adapted and fluidly coupled to selectively bleed fluid from the retarder-in conduit to modulate operation of the hydraulic retarder.

* * * * *